United States Patent Office 2,944,045
Patented July 5, 1960

2,944,045
STABILIZED VINYL RESIN COMPOSITIONS

Chrysosthenis M. Canarios, Maple Heights, Ohio, assignor to The Harshaw Chemical Company, Cleveland, Ohio, a corporation of Ohio No Drawing. Filed Mar. 9, 1959, Ser. No. 797,841

9 Claims. (Cl. 260—45.75)

This invention relates to storable polyvinyl chloride homopolymers and polyvinyl chloride copolymers molding compositions, which have been rendered stable to the degrading action of heat and pressure by the incorporation therein of a novel stabilizing component.

Vinyl resins containing halogens, such as chlorine and exemplified by polyvinyl chloride resins and copolymers of vinyl chlorides with other monomers, such as vinyl acetate and the like, have relatively very little resistance to heat. Upon exposure to heat, the resins deteriorate, lose strength and become more brittle and discolored. The degrading action of heat is especially pronounced during certain fabrication processes wherein the polymers are maintained under pressure in a plastic condition as, for example, in the molding of phonograph records.

It is an object of this invention to provide for novel vinyl resin molding compositions which are relatively stable to the degrading action of heat and pressure, the compositions being characterized by the presence therein of a novel, two-component stabilizing medium.

It is an other object of this invention to provide for novel vinyl chloride resinous compositions which are relatively stable to degrading action of heat and pressure after long periods of storage, the storable vinyl resinous compositions being characterized by the presence of such novel, two-component heat stabilizing medium.

Still another object of this invention is to provide novel vinyl chloride resin containing compositions suitable for phonograph record molding processes. The vinyl resin containing compositions are characterized by the presence of novel heat stabilizing components, said novel heat stabilizing components having the ability, even after long periods of molding composition storage, to prevent surface defects in the finished product.

Certain types of plastic fabrication processes make greater demands on the stability of a vinyl resin. Vinyl resin compositions employed in phonograph record molding operations have been found to be subjected to these increased demands. The vinyl resin compositions thus employed must be stable after long periods of storage, must be stable when subjected to heat under molding pressures, and must exhibit a maximum degree of conformity to the mold so that acceptable sound reproduction can be obtained.

The stability after storage requirement is the result of the use of stored sheet stock by phonograph record manufacturers. The sheet stock is produced by blending the various components used in vinyl resin molding mixtures into a virtually homogeneous mass and then rolling the mass into a sheet by use of apparatus similar to that used in compounding rubber. The sheet stock is then scored into rectangles known as biscuits. The biscuits are of such a size that an appropriate amount of stock is present to produce a finished phonograph record. As a manufacturer's requirements arise, individual biscuits are broken from the stored sheet stock so that such sheets may be on hand for a period ranging from several days to several months after the compounding and rolling operations have been carried out.

The requirement for stability under pressure molding operations is the result of the use of a flash-type mold in phonograph record manufacturing. In flash-type molding operations a biscuit is heated on a steam table until soft and then placed on the record die of the flash mold. The mold is then closed and the top surface pressed against the cavity forming undersurface by means of a hydraulic press. Sufficient pressure is exerted so that excess molding material is squeezed beyond the ring edge present around the periphery of the flash-type mold.

The requirement for a maximum degree of mold conformity is obvious. Thermal decomposition of the vinyl resin in phonograph record molding operations with resultant pits and blow holes would result in inferior sound reproduction and, therefore, a maximum degree of mold conformity free from surface defects resultant from vinyl resin breakdown is essential.

In a study of the characteristic thermal decomposition of vinyl chloride resinous compositions, it has been found that disassociation of HCl occurs and leads to the formation of conjugated color bearing polyene systems and that upon further HCl disassociation with an excess of oxygen, resultant double compounds are subjected to an oxidizing attack with the formation of carbonyl groups. Later on the presence of oxygen seems to diminish the disassociation of hydrogen chloride at the same time, perhaps chain disassociation and net-work reactions go on.

As a means of preventing thermic decomposition of vinyl resins certain groups of heat stabilizers have been developed. Heat stabilizers can be classified into several different types depending on the method by which they prevent or retard degradation of the vinyl polymer. One such important group is the metallic soaps. In part these depend for their action on the way that they may react with hydrogen chloride, resulting in the formation of harmless metal chloride and weak organic acid. Although the metallic cation of the soap is thought to play the major role in the stabilization of a vinyl resin, the anion or fatty acid portion of the soap is also important.

A second broad classification of heat stabilizers is the inorganic group. Inorganic heat stabilizers have been found to react with hydrogen chloride in a variety of ways. As this invention is concerned with the specific class of metal oxides, the numerous reactions which take place between inorganic heat stabilizers and the vinyl resin degradation products will not be discussed.

It has been found possible to obtain better all around stabilization by using a combination of stabilizers rather than one single stabilizer. The effects of a plurality of stabilizers are quite often synergistic rather than merely additive in their stabilizing effects. One theory is that two stabilizers have different rates or abilities to react with the hydrogen chloride, thus the more reactive of the stabilizers can take care of the peaks in HCl liberation, leaving the less active ones to perform over longer periods. While the theory behind the stabilizing action of the two component stabilizer of this invention is not known, the product has proven to be superior where storage of a stabilized vinyl resin and subsequent heat and pressure molding of a composition containing said stabilized vinyl resin are involved.

The first component of the heat stabilizer combination of this invention is selected from the group consisting of barium and lead salts of higher fatty acids. The acids from which the salts are prepared may have from 6 to 20 carbon atoms. Suitable organic acids from which the salts are prepared may be such saturated aliphatic acids as palmitic, stearic, 2-ethyl hexoic, and lauric, as well as such unsaturated aliphatic acids as linoleic, linolenic, oleic, ricinoleic, and cycloaliphatic acids as naphthenic, tall oil, rosin oil and rosin. The salt of the fatty acid or mixtures thereof may be employed in amounts ranging from 0.1 to 15 parts by weight per 100 parts by weight of polyvinyl chloride homopolymer or copolymer resin, and preferably are employed in amounts ranging from 0.5 to 4 parts by weight per 100 parts by weight of the resin.

The second component of the heat stabilizer combination of this invention is selected from the group consisting of barium, calcium, lead and magnesium oxides and mixtures thereof. One or a mixture of the oxides may be employed in amounts ranging from 0.1 to 15 parts by weight per 100 parts by weight of polyvinyl chloride polymers or copolymer resin and preferably are employed in amounts of 0.1 to 2 parts by weight per 100 parts by weight of the resin.

The stabilizer combination which has been found to give optimum results has the following composition:

|  | Optimum Amounts, pounds | Preferred Range, pounds |
| --- | --- | --- |
| Barium Stearate | 43 | 35 to 50 |
| Lead Stearate | 43 | 35 to 50 |
| Magnesium Oxide | 14 | 10 to 20 |

The stabilizing components may be incorporated in the resin by a number of methods, all of which are well known in the art. For example, the solid resin and stabilizing additives may be mixed together on hot rolls or in other mixing apparatus adapted to mix the solid resins. It is essential that the resinous components be intimately mixed and dispersed throughout the resin in order to effectively stabilize all portions thereof.

The vinyl resin of the stabilized system is selected from the group of vinyl chloride homopolymers and vinyl chloride-vinyl acetate copolymers, vinyl chloride-acrylonitrile copolymers and vinyl chloride-vinylidene chloride copolymers.

The heat stabilized vinyl chloride containing resins of the invention may also contain any of the well known plasticizers, extenders and other additives common to the vinyl resin art where, of course, these additives are not inconsistent with the specific product being produced.

The stabilized vinyl resin may be used as a molding composition with no further additions, or may be used as a component of more complex molding compositions. Examples of complex molding compositions for the use of the stabilized vinyl resin of this invention are as follows:

Example I 10 parts of resin prepared by condensing cresol and formaldehyde in the presence of HCl is mixed with 80 parts of asphaltic pitch and then mixed with 10 parts of vinyl resin, containing metallic soaps of the class consisting of barium stearate, lead stearate and mixtures thereof, and a metal oxide of the class consisting of calcium oxide, lead oxide, barium oxide, magnesium oxide and mixtures thereof, at a temperature not above 180° C.

Example II 20 to 50 parts of vinyl resin, containing a metallic soap of the class consisting of barium stearate, lead stearate and mixtures thereof, and a metal oxide of the class consisting of calcium oxide, lead oxide, barium oxide, magnesium oxide and mixtures thereof, is mixed with 3 to 10 parts of an acrylonitrile-butadiene synthetic rubber and 5 to 30 parts of an extender resin, said extender resin being selected from the group consisting of natural or synthetic resins.

Example III 15 parts of polyvinyl resin containing a metallic soap of the class consisting of barium stearate, lead stearate and mixtures thereof, and a metal oxide of the class consisting of calcium oxide, lead oxide, barium oxide, magnesium oxide and mixtures thereof is mixed with 23 parts of alkyd resin, 5 parts of pitch, 1 part Montan wax, 2 parts of carbon black and 53 parts of slate, milled at 145° C. to 155° C. and then pressed at 115° C. to 120° C.

The properly formulated mixtures when used in the production of phonograph records were charged into a plastic two-roll heated mill. After the required period of blending on the mill, the components were dispersed into a homogeneous mass and then discharged in sheet form. The sheet stock was then scored into rectangular biscuits, the biscuits being of sufficient size to provide enough stock for a phonograph record. The thus scored sheet stock is then stored until needed for molding operations at which time the desired number of biscuits are detached from the sheet.

The phonograph record molding compositions containing the stabilized vinyl resin of this invention were found to be superior to vinyl resins stabilized with the additives of the prior art, such as, for instance, those vinyl resins stabilized with dibasic lead stearate. The stabilized vinyl resins of this invention were found to exhibit an increased stability in areas where flash-molding operations and prolonged periods of storage of the molding compositions were called for.

Having thus described my invention, what I claim is:

1. A heat stable vinyl resin composition comprising 100 parts of a resin selected from the group consisting of polyvinyl chloride homopolymers and polyvinyl chloride copolymers and from 0.1 to 15 parts of each constituent of a stabilizing component, having the property of retaining stability after long periods of vinyl resin composition storage, said stabilizing component consisting of a metal salt of a higher fatty acid selected from the group consisting of barium and lead salts of higher fatty acids and mixtures thereof and a metal oxide of the class consisting of lead oxide, barium oxide, calcium oxide, magnesium oxide and mixtures thereof.

2. A heat stabilized vinyl resin composition of claim 1 having a stabilizing component wherein the metal salt of a higher fatty acid is a mixture of barium stearate and lead stearate and the metal oxide is magnesium oxide.

3. A heat stabilized vinyl resin composition of claim 1 having a stabilizing component wherein the metal salt of a higher fatty acid is a mixture of 35% to 50% by weight of barium stearate and 35% to 50% by weight of lead stearate and the metal oxide is 10% to 20% by weight of magnesium oxide.

4. A heat stabilized vinyl resin composition of claim 1 having a stabilizing component wherein the metal salt of a higher fatty acid is a mixture of 43% by weight of barium stearate and 43% by weight lead stearate and the metal oxide is 14% by weight of magnesium oxide.

5. In the process of flash-molding a phonograph record from a vinyl chloride containing molding composition, the step of stabilizing the vinyl chloride ingredient of the molding composition with a stabilizing component, said stabilizing component consisting essentially of a metal salt of a higher fatty acid selected from the group consisting of barium and lead salts of higher fatty acids and mixtures thereof and a metal oxide of the class consisting of lead oxide, barium oxide, calcium oxide, magnesium oxide and mixtures thereof.

6. The process of claim 5 wherein the metal salt of a higher fatty acid is a mixture of barium stearate and lead stearate and the metal oxide is magnesium oxide.

7. The process of claim 5 wherein the metal salt of a higher fatty acid is a mixture of 35% to 50% by weight of barium stearate and 35% to 50% by weight of lead stearate and the metal oxide is 10% to 20% by weight of magnesium oxide.

8. The process of claim 5 wherein the metal salt of a higher fatty acid is a mixture of 43% by weight of barium stearate and 43% by weight of lead stearate and the metal oxide is 14% by weight of magnesium oxide.

9. The phonograph record produced by the process of claim 5.

References Cited in the file of this patent

UNITED STATES PATENTS

| | | |
|---|---|---|
| 2,446,976 | Cousins | Aug. 10, 1948 |
| 2,684,353 | Greenspan et al. | July 20, 1954 |